April 15, 1924.
B. D. UNDERHILL
1,490,751
LENS SYSTEM FOR TAKING AND PROJECTING PICTURES IN NATURAL COLORS
Filed July 8, 1921
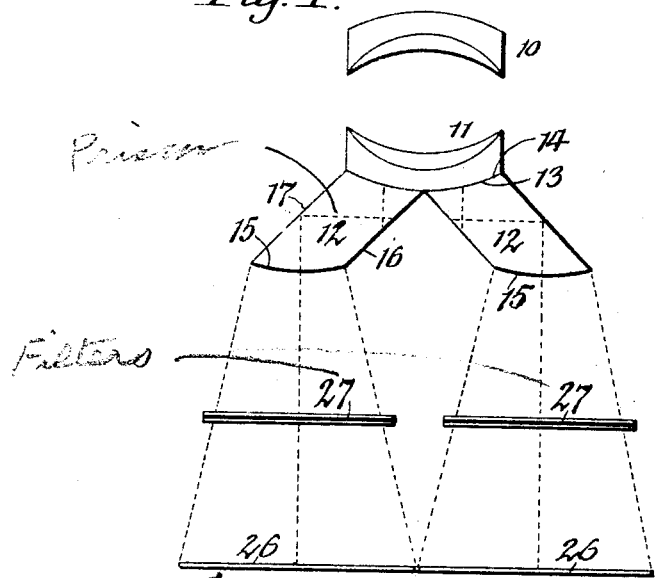
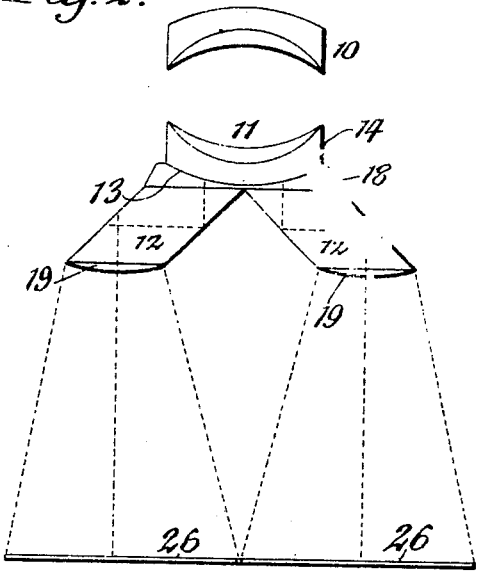
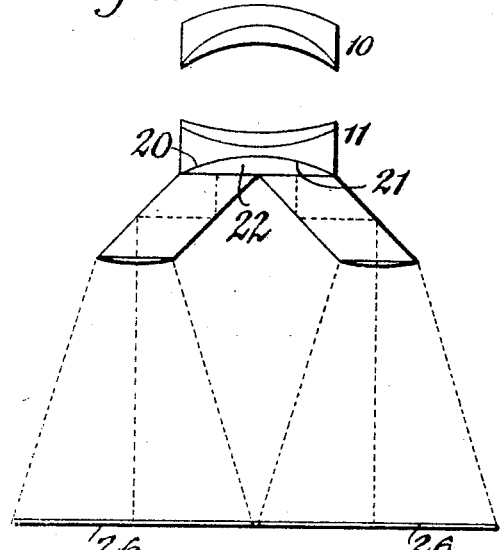
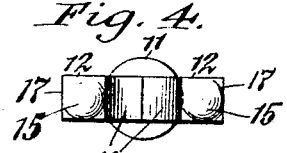
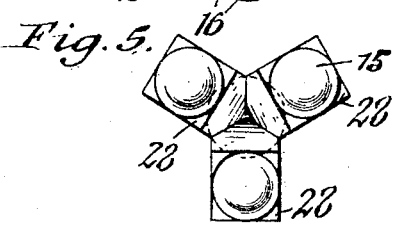
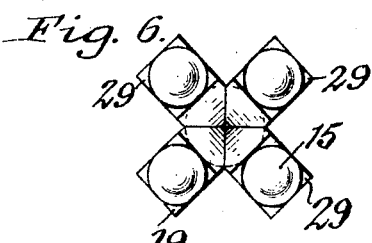
Inventor,
Benjamin D. Underhill
by Geyer & Popp
Attorneys.

Patented Apr. 15, 1924.

1,490,751

UNITED STATES PATENT OFFICE.

BENJAMIN D. UNDERHILL, OF NEW CANAAN, CONNECTICUT.

LENS SYSTEM FOR TAKING AND PROJECTING PICTURES IN NATURAL COLORS.

Application filed July 8, 1921. Serial No. 483,166.

*To all whom it may concern:*

Be it known that I, BENJAMIN D. UNDERHILL, a citizen of the United States, and resident of New Canaan, in the county of Fairfield and State of Connecticut, have invented new and useful Improvements in Lens Systems for Taking and Projecting Pictures in Natural Colors, of which the following is a specification.

My present invention has for its object to provide a photographic lens system for making two or more complementary images of an object and focusing them in fields in juxtaposition in a common plane, whereby by the use of suitable ray filters, negatives may be made which can be utilized for the subsequent projection of pictures in approximately their natural colors, or by means known in the photographic art, colored photographs can be made. By the use of a lens system embodying my invention, two or more photographs can be obtained by a single exposure, and the images thus formed utilized to give the proper color values for multi-color lithographic work where exact registration and relative density of parts of one color print is required with reference to other parts of the other color prints with which it is combined.

Another object of my invention is to provide means for the formation of a plurality of images which is capable of use with, or adaptation to, commercial high speed photographic lenses which are corrected for chromatic and spherical aberration, marginal distortion, etc., as by so doing I am enabled to provide the user with a complete lens system that combines the features of a particular lens that meets his particular requirements.

A feature of my invention is to provide an inexpensive construction which minimizes light losses due to the sub-division of the light rays; also minimizes the marginal distortion and obviates the formation of ghost images. To these and other ends my invention consists in certain improvements and advantages as fully set forth hereinafter and claimed at the end of this specification.

In the drawings, Figures 1, 2 and 3 are side elevations, partly in section, showing adaptations of my invention to objective lenses of different types.

Figures 4, 5 and 6 are bottom plan views showing an arrangement of two, three and four prisms, respectively, which may be provided for making, at a single exposure, a corresponding number of separate pictures, and Figure 7 is a view showing in side elevation a modification of the way in which the parts illustrated in Figs. 1 to 3 may be combined.

Similar reference numerals in the several figures indicate similar parts.

In carrying out my invention I employ as an objective or front element, a photographic lens that possesses the quality of speed and is preferably an astigmatically corrected lens, and with it I provide a rear element comprising a plurality of prisms arranged to sub-divide the bundle of light rays collected by the front element into a plurality of pencils which are diverged, each being subsequently reflected into parallelism with the axis of the lens system and focused in different adjacent fields, said fields lying side by side in a common plane.

In Figs. 1, 2 and 3 of the drawings the photographic lens is shown comprising the two parts 10 and 11, which may comprise any desired combination of separate lenses, to which are applied the prisms 12—12, two or more being employed and arranged at divergent angles, as shown in Figs. 4, 5 and 6. Each prism has an entrant face 13, two parallel reflecting faces 16 and 17, and an emergent face which may be curved, as indicated by 15 in Fig. 1, to provide a focusing lens, or such lenses may be formed separate from the prisms and applied as indicated by 19 in Fig. 2.

My invention has for one of its objects to obviate the formation of ghost images, and I find from experience that this can best be attained by bringing the entrant faces into engagement with the rear face 14 of the photographic lens combination, and giving to the emergent faces of the prisms such curvatures as are required to sharply focus the images formed by each in the same plane. If desired, instead of curving entrant faces of the prisms to fit the corresponding face of the objective lens, there may be fitted to the latter an intermediate block of glass or adapter, as indicated by 18 and 22 in Figs. 2 and 3, having one curved face fitting the lens proper and a plane surface against which the corresponding plane faces of the prisms are secured. An advantage resides in this arrangement of the parts as the adapter may be cemented to the prisms and these elements handled as a unit in mounting the whole combination.

In using the lens system described for the taking of pictures, the light rays entering the objective are subdivided equally at the point where they emerge from the rear face 14 of the objective lens system into two or more beams, or pencils, each of which is separately reflected outwardly and then rearwardly parallel with the axis of the objective lens. The separate ray pencils emerging from the rear ends of the prisms are focused to form images of equal area in the fields 26—26 which are occupied by a photographically sensitized surface, as will be understood. In making lantern slides for use in color photography, or photographing images for such use, ray filters 27—27 of the proper color values will be interposed in the path of the light beams at a suitable point in front of the fields 26—26, as shown in Fig. 1.

It will be understood, of course, that the lens system may be used as a projector by directing rays of light from a source of illumination through positively printed transparencies, such as lantern slides, located in the field 26—26, in which event the images will be superposed and the complete picture formed on a screen located in the focus of the objective lens.

A lens system constructed in accordance with my present invention possesses the advantage of being capable of assembly in a single mounting. By bringing the diverging prisms closely together and into intimate contact with the rear face of the objective lens, I obtain exactly equal divisions of the collected bundle of light rays which are proportioned among the several prisms directly, thus giving to the separate pencils of reflected rays light paths of equal length, which enables me to make the prisms all of equal size and of minimum length.

What is claimed is:

1. The combination with a photographic lens system comprising an objective, of a plurality of prisms in rear of the rear face of said lens system one or more of which is in intimate contact with said rear face, said prisms being arranged to sub-divide the bundle of light rays collected by the objective into equal pencils of light, and comprising reflecting surfaces for directing each of said pencils laterally and rearwardly into parallelism with the axis of the lens system and lenses at the emergent faces of the prisms for receiving and focusing the separate pencils in adjacent fields lying in the same plane.

2. The combination with a photographically corrected lens system comprising an objective, of a plurality of prisms in rear of the objective, one of which at least is in intimate contact with said rear face, said prisms being arranged to collect and form equal pencils of rays from the beams of light emitted from the objective, and having reflecting surfaces serving to diverge the pencils of rays and direct them into parallelism with the axis of the lens system and lenses at the emergent faces of the prisms for focusing the separate pencils of rays to form images of equal area in adjacent fields.

3. The combination with a photographically corrected lens system, of a plurality of prisms each mounted with a light entrant face in engagement with the rear surface of said lens system, said prisms being disposed at divergent angles to the axis of the lens system and comprising reflecting surfaces disposed to direct the light rays passing through the prisms in directions parallel to the axis of said lens system and lenses on the rear ends of the prisms complementary to said rear face of the lens system and serving to focus the emerging light rays in adjacent fields lying in the same plane.

BENJAMIN D. UNDERHILL.